Figure 1:
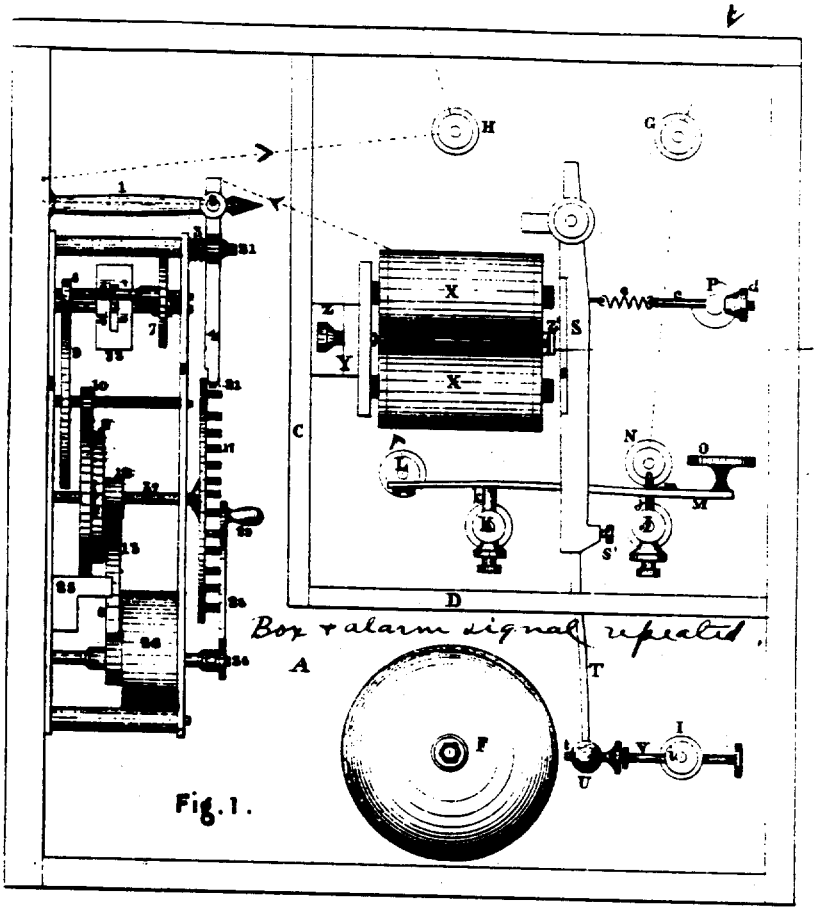

2 Sheets Sheet 1.

A. Allen,

Fire Telegraph.

No. 4012. Reissued June 7. 1870.

Witnesses.

Alexander Allen, Inventor
by his Attorney.

N. PETERS, PHOTO-LITHOGRAPHER, WASHINGTON, D. C.

2 Sheets, Sheet 2

A. Allen,

Fire Telegraph.

No. 4012.

Reissued June 7. 1870.

Andrew Schoffel
Ruth K. Abbott } Witnesses.

Alexander Allen, Inventor
by Jos. Abbott, Attorney

N. PETERS, PHOTO-LITHOGRAPHER, WASHINGTON, D.C.

UNITED STATES PATENT OFFICE.

ALEXANDER ALLEN, OF ROCHESTER, NEW YORK.

IMPROVEMENT IN FIRE-ALARM SIGNALS AND APPARATUS.

Specification forming part of Letters Patent No. 90,806, dated June 1, 1869; Reissue No. 4,012, dated June 7, 1870.

DIVISION A.

*To all whom it may concern:*

Be it known that I, ALEXANDER ALLEN, of Rochester, Monroe county, New York, have invented certain new and useful Improvements in Fire-Alarm Signals and Apparatus; and that the following is a full, clear, and exact description of that part of my invention relating to fire-alarm signals for fire-alarm telegraphs.

This invention relates to an improved system of signals for giving the alarm of fire from any station in a fire-alarm-telegraph circuit, said system of fire-alarm signals consisting of a series of rapid alarm-signals and a series of box-signals, so arranged as that an alarm-signal is interposed between any two successive box-signals, whereby the danger of mistake in getting the correct number of the station at which the alarm was given is materially diminished.

This invention also relates to the construction of mechanism for mechanically opening or closing the circuit of a fire-alarm telegraph in such a manner as to produce the system of fire-alarm signals herein described, said mechanism consisting of a circuit-wheel acting in combination with a lever which opens and closes the circuit, and having secured on it a series of notches or pins so arranged as that the revolutions of the circuit-wheel shall cause one or more alarm-signals and two or more box-signals, an alarm-signal being interposed between any two successive box-signals, whereby a mechanism is obtained by which any person, with little or no experience in fire-alarm telegraphing, can use this improved system of firm-alarm signals for giving an alarm of fire at any required station with great accuracy and with but little chance of error.

This invention also relates to the construction of mechanism for automatically breaking and closing the circuit of a fire-alarm telegraph in such a manner as to give an alarm of fire at the required station by the system of fire-alarm signals herein described, said mechanism consisting of an automatic circuit-breaker so constructed as that when acting to give an alarm it shall first give an alarm-signal, then a box-signal, then repeat alarm-signal, then repeat box-signal, and so on, whereby any person possessing sufficient skill to wind up the automatic circuit-breaker can cause an alarm of fire to be automatically transmitted from the signal-station by the improved system of fire-alarm signals herein described, thus enabling the public to transmit an alarm of fire by a system of signals which effectually prevents any danger of mistaking the number of the station from which it was transmitted.

To enable others skilled in the art to use this improved system of fire-alarm signals, the following description is given of one practical construction for the same, from which its application to other constructions will be evident to any mechanic.

The number of the signal-station from which the alarm of fire is to be given is supposed to be forty-three, (43,) and the number of blows in an alarm-signal is taken as twelve, (12.) If, now, we suppose a blow on the gong or sounder in the fire-alarm-telegraph circuit to be represented by a vertical line, thus, |, and the spaces between the alarm and box signals to be represented by a dash, —, and that the box-signal is to be repeated three times in order to avoid error, the system of fire-alarm-signals for this station will be represented thus:

| | | | | | | | | | | | — | | | | - | | | — | | | | | | | |
| | | | - | | | | - | | | - | | | | | | | | | | | | — | | | | -
| | |.

To give this alarm-signal with the common telegraph-key in an ordinary fire-alarm telegraph, which is usually worked with a clos d circuit, the operator breaks the circuit twe ve times in rapid succession by depressing the key that number of times by means of his fingers resting on the knob of said key, which causes twelve rapid blows to be struck on the gong or sounder by the action of electro-magnets upon a pivoted armature-lever. Then, after a short interval, he breaks the circuit four times, but not as rapidly as before; then, after another short interval, he breaks the circuit three times with the same rapidity of succession as in making the four preceeding breaks, thus causing a series of four and of three blows to be given on the gong or sounder. Then, after a short interval after the last-mentioned three breaks, he again breaks the circuit twelve times in rapid succession; then, after an interval, he repeats the four breaks; then, after an interval, he repeats the three breaks, and so on for the third alarm-signal and box-signals. By this operation there is given on the gong or sounder, situated in the engine-house or station to which the alarm is to be given, a series or system of blows or signals consisting of twelve rapid blows, which constitute what is called an "alarm-signal," and of four and three blows, which constitute what is called a "box-signal," these alarm-signals and box-signals being repeated three times, as before shown.

The attendant at the engine-house, upon hearing the first alarm-signal, is notified of the fact that a fire-alarm has been commenced at some station on the circuit, and by waiting until the alarm-signal is completed and the box-signal is given he learns the number of the station giving the alarm. If he were not in hearing distance when the fire-signal first commenced, or has any question as to whether he has heard the number correctly, he has only to wait until the second alarm-signal is given, when the box-signal will be again repeated, as is readily seen.

The peculiar advantage of this system of fire-alarm signals, whereby an alarm-signal is interposed between any two successive box-signals, will be readily seen by supposing the alarm-signal to be left out, and that the box-signals be given in succession, as has been heretofore the practice, when we shall have this series of blows on the gong or sounder, | | | |-| | |-| | | |-| | |-| | | |-| | |, that is, a succession of four and three blows at short intervals, as indicated.

Now, if the attendant at the engine-house did not hear the first blow, or made any mistake in counting the first part of the box-signal, he can easily mistake box 43 for box 34 by simply getting the last part of the box-signal first, and in case he makes this mistake he has nothing to show him his error; whereas in the improved system of signals before described he will always hear the rapid alarm-signal between the last part of any box-signal and the first part of the succeeding one, thus preventing the possibility of his uniting the first and last parts of two different box-signals, and thus mistaking the number of the box or station giving the fire-alarm, and affording him a chance to verify his first rendering of the box-signal by waiting until an alarm-signal is given.

The spaces or intervals of time between the blows making the alarm-signals and the blows making the box-signals, as well as the spaces or intervals between the alarm and box signals and between the parts of the box-signals, can be varied to suit the character of the striking mechanism or the expertness of the engine-house attendant, (a gong instrument requiring a slower stroke than a common telegraph-sounder, and an attendant familiar with the signals being able to receive a more rapid signal than a less experienced person;) but an interval of one-third of a second between the alarm-signal blows and of two-thirds of a second between the box-signal blows, and an interval of three seconds between the alarm-signals and the box-signals, and of two seconds between the parts of the box-signal, will be found to give a distinct system of signals for ordinary instruments and attendants.

Figure 2:
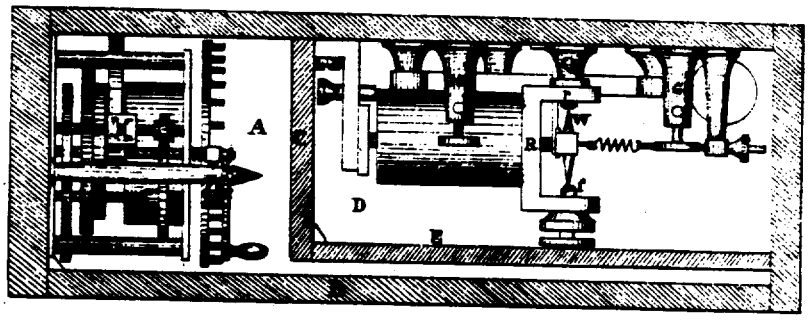

A practical form of instrument for transmitting this system of signals in shown in Figures 1 and 2 of the annexed drawings, forming a part of this specification, Fig. 1 being an elevation of signal-box with outer and inner doors removed, and Fig. 2 being a sectional plan with both doors in position.

A represents the main box, which is provided with the outer door, B, and has an inner partition, C D, with door E, to inclose the key M, to prevent persons who should only have access to the automatic circuit-breaker from operating with the key. The key M is a piece of elastic metal provided with the knob O and point *m*, and is secured to the standard L, with a bearing on the adjusting-screw *k* in the standard K, its movement being limited by the screw *j* in the standard J, as shown. The point *m*, when the circuit is closed, touches the point *n* in the standard N, and said standard is electrically connected, by a wire, (indicated by dotted lines in Fig. 1,) with the screw-cup G, in which one end of the main-circuit wire is secured. The standard L is also electrically connected, by a connection indicated by dotted lines in Fig. 1, (which will be hereinafter more fully described,) with the screw-cup H, in which is secured the other end of the main-circuit wire, from which it is readily seen that by pressing on the knob O so as to draw the point *m* away from the point *n* the circuit can be broken, as desired, the key closing the circuit by reason of its own elasticity as soon as the pressure is removed from the knob O.

The mechanism for receiving the signals at the engine-house is of the same general construction as that shown in the signal-box, (where it is placed to enable the operator to hear his own signals to be sure of their correctness,) and it consists of the electro-magnets X X, which are secured on the standard Y, and in front of which is hung the armature-lever S, provided with armature *s*. The armature-lever S has the rod W passing through its upper end, which rod is pivoted between the pivot-point *r*, on the inner side of the standard Q R, and the pivot-screw *f*, passing through the outer arm of said standard.

The tension-spring *e* is attached to the back of the lever S and to the screw *c*, which passes through the standard P, and is provided with a nut, *d*, as shown.

The hammer-rod T is secured by a screw, S′, in the end of the lever S, and has the ball U, with the hammer-screw *t* at its lower end, the forward movement of the lever S causing the

BEST AVAILABLE COPY hammer-screw *t* to strike the gong F secured on a standard in the back of the box A, and the backward movement of the lever S being limited by the rod V, which is placed behind the hammer-screw *t* in a standard, I, in which it is clamped in any desired position by a screw, *i*, in the head of said standard.

An elastic plate, Z′, is secured to the back of the box A, with its front end in front of the armature *s*, and a screw, Z, passes through the standard Y and presses against said plate, so that by turning up the screw Z the armature *s* may be prevented from coming in contact with the cores of the electro-magnets X X.

From this description it is readily seen that if the ends of the wires on the electro-magnets X X be connected with the ends of the main-circuit wire the closing of the circuit will cause the magnets to attract the armature *s*, and thus vibrate the lever S, which will cause a blow to be struck by the hammer-screw *t* on the gong F, and the breaking of the circuit will cause the magnets to lose their attracting power, so that the lever S will be drawn back by the spring *e*, from which it is evident that the breaking and closing of the circuit by the key M will effect the striking of the desired signals on the gong F.

Figure 3:
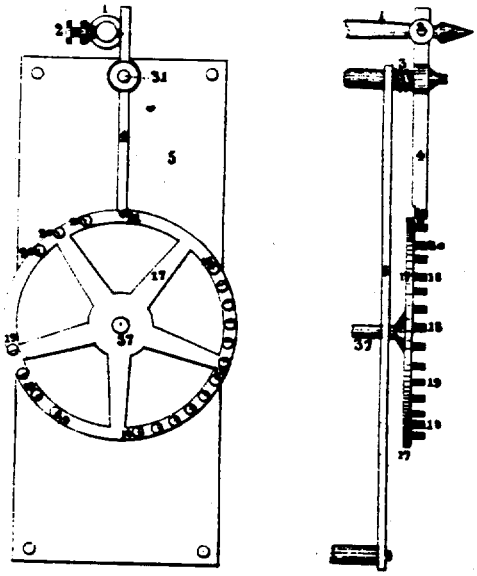
Figure 4:
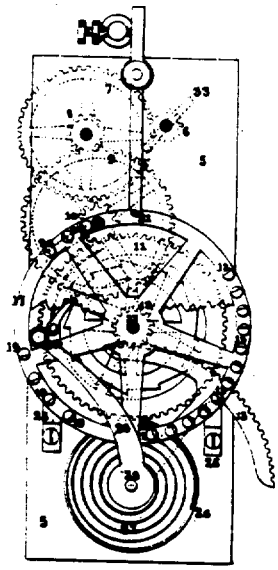
Figure 5:
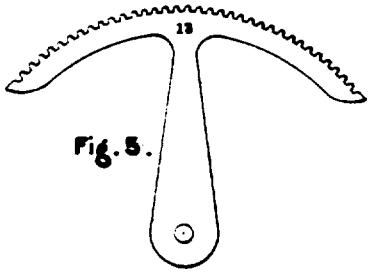

To construct a mechanism for mechanically opening and closing the fire-alarm-telegraph circuit to give a fire-alarm with the system of fire-alarm signals herein described, the pins 18 18 19 19 20 20 are arranged in the circuit-wheel 17, as shown in Fig. 3, which are front and side views of the mechanism about to be described.

The pins 18 18 are twelve in number, and are placed at equal distances from each other, and may be termed the "alarm-signal pins," and the pins 19 19 and 20 20 are four and three in number, respectively, and are arranged as shown, the spaces between the pins 18 18 19 19 20 20 being of a considerable length, and the spaces between the different pins 19 and 19 and 20 and 20 being equal, but about twice as long as the spaces between the different pins 18 and 18, and the term "box-signal pins" being used to designate the pins 19 and 19 and 20 and 20.

The circuit-wheel 17 is hung on the shaft 37 in the plate 5, and the lever 4 is hung on the pivot 31 on said plate, and is kept pressed against the screw 2 in the standard 1 by the spiral spring 3 in the pivot 31, one end of which is secured to the plate 5 and the other end to the lever 4. The lever 4 being hung over the pins 18, 19, and 20, in the circuit-wheels 17, in such a position as that said pins can strike the rod 21 in the lever 4, and the two ends of the circuit being connected to the standard 1 and lever 4 respectively, it is evident that if the circuit-wheel 17 be made to revolve from right to left, either by a crank on the circuit-wheel 17 or on the shaft 37, or in any other suitable manner, the pins 18, 19, and 20 will vibrate the lever 4, and thus cause the breaking of the circuit, the breaks caused by the alarm signal pins making the alarm-signal on the gong or sounder, and the breaks caused by the box-signal pins making the box-signal, as is readily seen, and two or more rotations of circuit-wheel will give two or more alarm-signals and two or more box-signals, an alarm-signal being interposed between any two successive box-signals, in accordance with the improved system of signals before shown.

In the automatic mechanism herein shown the shaft 37 of the circuit-wheel 17 is journaled in the plates 5 5, and a shaft, 38, is journaled in said plates below the shaft 37, and has secured on it the geared sector 13, which meshes into a pinion, 12, on the shaft 37.

The spiral spring 27 is placed in the box 26, and has one end fastened to the box 26 and the other end to the shaft 38, and the crank 28, with handle 29, is secured on the shaft 38, as shown.

Figure 6:
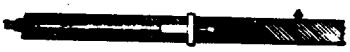

The rod 21 is arranged to slide in the lever 4, as shown in Fig. 6, and its lower end is beveled off, as shown, so that as the circuit-wheel 17 is revolved from left to right the pins 18 19 20 will raise the rod 21, and thus pass under the lever 4 without breaking the circuit.

The geared sector 13 is limited in its movement by the stops 25 25, and the automatic movement of the circuit-wheel is regulated through the gear-train 11 10 9 8 7 6 and the fan 33, in a manner readily seen. The sizes of the geared sector 13 and pinion 12 are so adjusted as that the movement of said sector from one stop, 25, to the other shall cause three revolutions of the circuit-wheel 17, from which it is seen, by rotating the sector 13 from its position on the stop 25 to its opposite position on the other stop 25, by means of the handle 29 on the crank 28, the circuit-wheel 17 will make three revolutions from left to right without breaking the circuit, as before shown, and the spring 27 will be wound up, when, by releasing the handle 29, the circuit-wheel 17 will make three revolutions from right to left, and will thus break the circuit so as to cause three alarm-signals and three box-signals through the action of the alarm-signal pins 18 18 and the box-signal pins 19 19 20 20 on the lever 4, as before shown.

A more detailed description of the automatic mechanism herein shown will be found in the specification and drawings in Division B of this reissued patent, to which reference is made.

The electric circuit through the signal-box and mechanism shown in Fig. 1 is from the screw-cup G to standard N by a wire (indicated by dotted lines,) thence through points *n m* and key M to standard L, thence by wire (indicated by dotted line) to wire on the electro-magnets X X, thence by wire (indicated by dotted line) to lever 4, and through screw 2 to standard 1, thence by wire (indicated by dotted line) to the screw-cup H.

Having thus fully shown one practical construction of this improved system of fire-alarm signals, and of the mode of using the same as well as of the mechanical and automatic devices

BEST AVAILABLE COPY for producing the same in or through a telegraph-circuit, it will be evident to any mechanic that various modifications in the details of construction may be made without changing the general principles—as, for example, the number of blows in an alarm-signal can be varied, or the fire-alarm signal might commence with a box-signal to be followed by an alarm-signal, and then a box-signal, in place of commencing with an alarm-signal to be followed by a box-signal and then an alarm-signal; or the pins 18 19 20 might be inserted in the face instead of in the side of the circuit-wheel 17, or notches might be cut in said circuit-wheel in place of using said pins, or that other and different constructions of automatic circuit-breakers or fire-alarm apparatus could be adapted to the giving of fire-alarms upon the system of fire-alarm signals herein shown.

I am aware that alarm-signals consisting of a succession of rapid blows on a gong or sounder have been before used, and that box-signals consisting of one or more groups of blows or taps, designating the number of the station giving an alarm of fire, are well known; hence I lay no claim to these signals, except when combined in the manner herein shown; nor do I here lay any claim to a circuit-wheel provided with notches or pins and acting in combination with a pivoted lever; nor to the construction of an automatic fire-alarm apparatus or circuit-breaker, except when said circuit-wheel, with its notches or pins, or said automatic circuit-breaker, are so constructed or arranged as to act as mechanical or automatic agents for producing the system of fire-alarm signals herein described; but What is herein claimed as my invention, and what I desire to secure by these reissued Letters Patent, is—

1. The interposition of an alarm-signal between any two successive box-signals in sounding a fire-alarm on a fire-alarm telegraph, for the purpose of preventing mistakes in getting the number of the station or box giving the alarm, substantially as is herein specified.

2. The system of signals for fire-alarm telegraphs herein shown, composed of a series of rapid alarm-signals and a series of box-signals, when the same are so used as that an alarm-signal is interposed between any two successive box-signals, substantially as is herein specified.

3. The arrangement of a series of pins or notches upon a circuit-wheel, used, in combination with a pivoted lever, for the purpose of breaking the circuit in a magnetic fire-alarm telegraph, in such a manner that the revolutions of said circuit-wheel shall cause two or more box-signals and one or more alarm-signals, an alarm-signal being interposed between any two successive box-signals, substantially as is herein specified.

4. An automatic fire-alarm apparatus for fire-alarm telegraphs, when so constructed and arranged as that when acting to give an alarm of fire it shall first give an alarm-signal, then a box-signal, then repeat alarm-signal, then repeat box-signal, and so on, substantially as is herein specified.

As evidence of the foregoing amended specification and claims I have hereunto set my hand this 2d day of May, A. D. 1870.

ALEXANDER ALLEN.

Witnesses:
S. D. CUSHMAN,
D. L. WOOD.